United States Patent [19]

Hoffmann

[11] Patent Number: 4,888,466

[45] Date of Patent: Dec. 19, 1989

[54] MACHINE FOR MAKING HOT TEA

[75] Inventor: Erich Hoffmann, Bergisch-Gladbach, Fed. Rep. of Germany

[73] Assignee: Robert Krups Stiftung & Co. KG., Solingen, Fed. Rep. of Germany

[21] Appl. No.: 207,763

[22] Filed: Jun. 16, 1988

[30] Foreign Application Priority Data

Jul. 11, 1987 [DE] Fed. Rep. of Germany ....... 3723018

[51] Int. Cl.⁴ .................. A47J 31/54; A47J 31/04
[52] U.S. Cl. ................................ 219/301; 99/307; 219/311; 219/338
[58] Field of Search .................. 338/306, 314; 99/279–282, 288, , 304–307; 219/543, 301, 302, 329, 334, 335, 338, 310, 311

[56] References Cited

U.S. PATENT DOCUMENTS

| 3,589,273 | 6/1971 | Karlen | 99/307 |
| 4,155,292 | 5/1979 | Rickert | 99/307 |
| 4,613,844 | 9/1986 | Kent et al. | 338/314 |
| 4,676,148 | 6/1987 | Foley | 99/279 |
| 4,741,259 | 5/1988 | Ogata et al. | 99/281 |

FOREIGN PATENT DOCUMENTS 934178 9/1973 Canada ........................... 99/304

Primary Examiner—A. D. Pellinen
Assistant Examiner—Geoffrey S. Evans
Attorney, Agent, or Firm—Peter K. Kontler

[57] ABSTRACT

A machine for making hot tea wherein a pressure-resistant container for the supply of water supports or embodies an insulating carrier for one or more thick film conductors. A riser, which can be caused to move up and down relative to the bottom wall of the container, serves to convey hot water into a steeping receptacle wherein the water comes in contact with tea leaves. The sealable outlet in the bottom of the steeping receptacle can discharge hot tea into a vessel resting on a warming plate. The warming plate is supported by a leg of the housing for the container and steeping receptacle and can be heated by a second heater having a carrier for one or more thick film conductors.

20 Claims, 3 Drawing Sheets

MACHINE FOR MAKING HOT TEA

CROSS-REFERENCE TO RELATED CASES

A machine for making coffee and other hot beverages which employs electric heaters with thick film conductors is disclosed in my commonly owned copending patent application Ser. No. 207,764 filed June 16, 1988.

Another machine for making hot beverages which employs an electric heater with thick film conductors is disclosed in my commonly owned copending patent application Ser. No. 207,762 filed June 16, 1988.

My commonly owned copending patent application Ser. No. 056,852 filed June 1, 1987 (now U.S. Pat. No. 4,765,422 granted Aug. 23, 1988) discloses a bathroom scale with a strain gauge employing a resistor which is a thick film conductor.

My commonly owned copending patent application Ser. No 056,855 filed June 1, 1987, now abandoned, discloses a printed circuit with one or more thick film conductors for use in an electric hair dryer.

My commonly owned copending patent application Ser. No. 056,854 filed June 1, 1987 discloses a rotor for an electrical machine wherein the commutator comprises thick film conductors.

BACKGROUND OF THE INVENTION

The invention relates to improvements in machines for making hot beverages, especially tea. More particularly, the invention relates to improvements in machines of the type wherein the housing supports or includes a pressure-resistant container for a supply of liquid to be heated (i.e., water if the machine is a tea maker), wherein an electric heater is located in the region of the lower part of the container to heat the supply of liquid therein, wherein the means for conveying heated liquid from the container into a steeping receptacle can include a riser which dips into the container and can discharge a stream of heated liquid into the receptacle wherein the heated liquid contacts a supply of flavoring agent (such as tea leaves), and wherein the receptacle has a sealable outlet which serves to dispense hot beverage into a cup, into a teapot, into a teakettle or into any other suitable vessel serving to confine a supply of hot beverage.

An appliance of the above outlined character is disclosed in German Offenlegungsschrift No. 2 428 165. This appliance can serve as a coffee or tea making machine, and the heater for the supply of liquid is installed directly in the interior of the container for the liquid. The container is designed to resist pressures which develop as a result of heating the liquid therein and is disposed at a level below a steeping receptacle which is adequately sealed to prevent the escape of aroma. The receptacle has a first chamber for heated water and a second chamber for a supply of comminuted coffee beans or tea leaves. The bottom wall of the first chamber carries a solenoid-operated valve which at first prevents the escape of hot beverage from the receptacle. A riser is provided to convey heated water from the container into the receptacle. The lower end of the riser serves to receive heated water and is located close to the bottom wall of the container, i.e., close to the electric resistance heater in the container. The riser extends through the bottom wall of the receptacle (this receptacle can constitute a portion of or the entire cover for the container), and the upper end of the riser is located in the interior of the receptacle, namely close to the removable cover of the receptacle. The electric heater is designed to boil water in the container so that the pressure in the container rises and boiling water flows upwardly into and through the riser to contact the supply of flavoring agent in the receptacle. The operator can select the duration of the interval of contact between water and the flavoring agent in the receptacle. To this end, the machine is equipped with a clock which can open the solenoid-operated valve after a selected interval of time so that the beverage can flow into a suitable vessel which is placed below the bottom wall of the receptacle.

A drawback of the just described machine is that it must employ a very long riser which extends from the bottom wall of the container for the supply of liquid and all the way to the cover of the steeping receptacle. The riser is permanently secured to the top wall of the container, i.e., to the bottom portion of the receptacle if such bottom portion is the top wall of the container. Thus, the operator is not in a position to shift the riser longitudinally and to thereby select the quantity of liquid which can remain in the lower portion of the container.

Another drawback of the aforediscussed machine is that the conventional electric resistance heater is installed in the interior of the container. This might contribute somewhat to compactness of the machine but presents serious problems as concerns the sealing of current-conducting parts of the heater from water in the interior of the container.

German Pat. No. 686 482 discloses a different machine for the making of tea or coffee. The patented machine employs three vessels which are located one above the other. The uppermost vessel is a container which serves to receive a supply of liquid to be heated and is provided with an external heating strap. The bottom wall of the container is provided with a valve which serves to discharge hot water into a second vessel below the container, namely a steeping receptacle with a filter which can be sealed by a valve. The lowermost vessel serves to receive hot beverage from the receptacle and can be provided with means for facilitating dispensing of hot beverage into cups, bowls or the like. A drawback of the patented machine is its pronounced height. Moreover, each of the two upper vessels must be provided with a discrete valve which contributes to the initial cost. Additional costs arise if the valves are controlled by clocks or by other auxiliary equipment. Still further, the efficiency of the patented machine is unsatisfactory because the aforementioned heating strap is located externally of the container for the supply of liquid to be heated so that only a small percentage of heat which is generated by such heater is actually used to raise the temperature of the liquid in the container.

German Pat. No. 3 312 354 discloses a machine with three superimposed vessels which constitutes an improvement over the machine of German Pat. No. 686 482 and is designed to make hot tea. One of the three vessels in the machine of German Pat. No. 3 312 354 is a container which serves to receive a supply of water and is provided with a heater, with a cover and with a sealable device which conveys hot water into a steeping receptacle. The outlet of the steeping receptacle is disposed above and can admit hot beverage into the third vessel. The sealable water conveying device is a riser which acts as a siphon, and the outlet of the steeping receptacle is controlled by a clock so that it can discharge fresh beverage after elapse of a selected interval of time. The machine of this German patent also exhibits several drawbacks, especially as regards its overall height (the three vessels are disposed one above the other). Moreover, the controls (normally electronic controls) are expensive, and the heating action of the conventional resistance heater is not overly satisfactory.

OBJECTS AND SUMMARY OF THE INVENTION

An object of the invention is to provide a novel and improved appliance, especially a tea making machine, whose heater is simpler, more economical, longer-lasting and less sensitive than the heaters of presently known machines.

Another object of the invention is to provide a simple and compact machine which need not employ three superimposed vessels.

A further object of the invention is to provide a novel and improved method of installing the heater on or in the container for the supply of liquid to be heated.

An additional object of the invention is to provide a machine wherein the energy requirements of the heater can conform to the quantity of liquid to be heated.

Still another object of the invention is to provide novel and improved means for heating the vessel which contains the supply of hot beverage.

A further object of the invention is to provide the machine with novel and improved means for conveying liquid from the container into the stepping receptacle.

An additional object of the invention is to provide a novel and improved container which can be used in the above outlined machine.

The improved machine is used to make a hot beverage, particularly tea, by contacting a heated liquid (normally water) with a flavoring agent (such as tea leaves). The machine comprises a housing having a permanently installed or separable and preferably pressure-resistant container for a supply of liquid (the container includes an upper portion at least a part of which can transmit light so as to enable a person to determine the quantity of liquid in the container, and a lower portion which can be made of a metallic or an insulating material), a steeping receptacle which serves to receive a supply of flavoring agent and a hot beverage and is provided in or on the housing and has a sealable outlet for hot beverage, an electric heater for the supply of liquid in the container, and conduit means for conveying heated liquid from the container into the receptacle. In accordance with a feature of the invention, the electric heater comprises at least one insulating carrier in the region of the lower portion of the container, at least one thick film conductor which is applied to the carrier, and the necessary auxiliary means for connecting the conductor or conductors with an energy source so as to ensure that the conductor or conductors will heat the supply of liquid in the container.

The lower portion of the container includes a bottom wall, and the conduit means preferably comprises a riser which extends into the container and has a liquid-admitting open lower end adjacent the bottom wall.

The carrier can include a plate-like member beneath the bottom wall so that its upper side is adjacent the bottom wall (the plate-like member can be bonded to the underside of the bottom wall). The thick film conductor or conductors are applied to the underside of the plate-like member. The carrier can be made of a ceramic material, a plastic material or any other material which is an electrical insulator and can be properly secured to the container and can accept a paste which is caused to set so as to form one or more thick film conductors. The carrier will be applied to the lower portion of the container if the lower portion is not an insulator (such lower portion can be made of aluminum or of any other suitable metallic material). As mentioned above, at least a part of the upper portion of the container can be made of a light-transmitting material, and such upper portion can be provided with graduations which indicate various quantities of liquid in the container. The two portions of the container can be separably connected to each other with the interposition of suitable sealing element or elements to prevent uncontrolled escape of liquid from the container. The housing of the improved machine is or can be hollow and can comprise a ledge or another suitable support for the container if the latter is separable from the housing.

If the lower portion of the container is made (at least in part) of an insulating material, at least one wall (particularly the bottom wall) of such lower portion can constitute the aforementioned carrier of the electric heater. Thus, the thick film conductor or conductors can be applied directly to the outer side or outer sides of one or more walls of the lower portion of the container. It is even contemplated to provide at least one carrier on at least one wall of the upper portion of the container if it is desirable or necessary to ensure very rapid heating of a relatively large supply of liquid in the container.

If the electric heater comprises a plurality of thick film conductors, the machine preferably further comprises means for selectively connecting one or more conductors with a source of electrical energy. To this end, the housing can carry two or more readily accessible pushbuttons, knobs or other suitable actuators to connect one, two or more thick film conductors with an outlet or with another energy source and to thus determine the interval of time which is required to heat the liquid in the container to a temperature which suffices for the making of a satisfactory hot beverage. The conductors can offer different resistance to the flow of electric current; to this end, the carrier can support at least one relatively wide and at least one relatively narrow thick film conductor. Furthermore, the conductors can include at least one shorter and at least one longer conductor.

The riser can be mounted in the container and/or in the housing in such a way that its liquid admitting opening can be moved up and down, i.e., away from and nearer to the bottom wall of the lower portion of the container. In this manner, the operator can determine the quantity of liquid which is conveyed from the container into the steeping receptacle. As a rule, the liquid-admitting opening will be provided in or close to the lower end of the riser. The riser can comprise a plurality of tubular sections which are telescoped into each other, and the riser can be vertically movably mounted in the top wall of the container.

In accordance with a further feature of the invention, the housing includes a support for a teapot or any other suitable vessel which is located beneath the sealable outlet means of the steeping receptacle to receive hot beverage in response to opening of the outlet means. The support carries or confines means for heating the vessel on the support so that the temperature of the beverage in the vessel can be maintained within an optimum range. The heating means can include a conventional resistance heater in conjunction with a suitable warming plate, or at least one insulating carrier for one or more thick film conductors which can be connected with the energy source independently of the conductor or conductors of the heater for the liquid in the container. At the very least, the controls of the machine are preferably such that the means for heating the vessel on the support can remain operative after the heating action upon the liquid in the container is already terminated, e.g., because the entire supply of liquid has been transferred into the receptacle or because the supply of liquid in the container has descended below the level of the liquid admitting opening (or below the lowest liquid admitting opening) in the riser. Therefore, the operator can select the interval of time during which the heating means is effective to prevent excessive cooling of the beverage in the vessel on the support of the housing.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
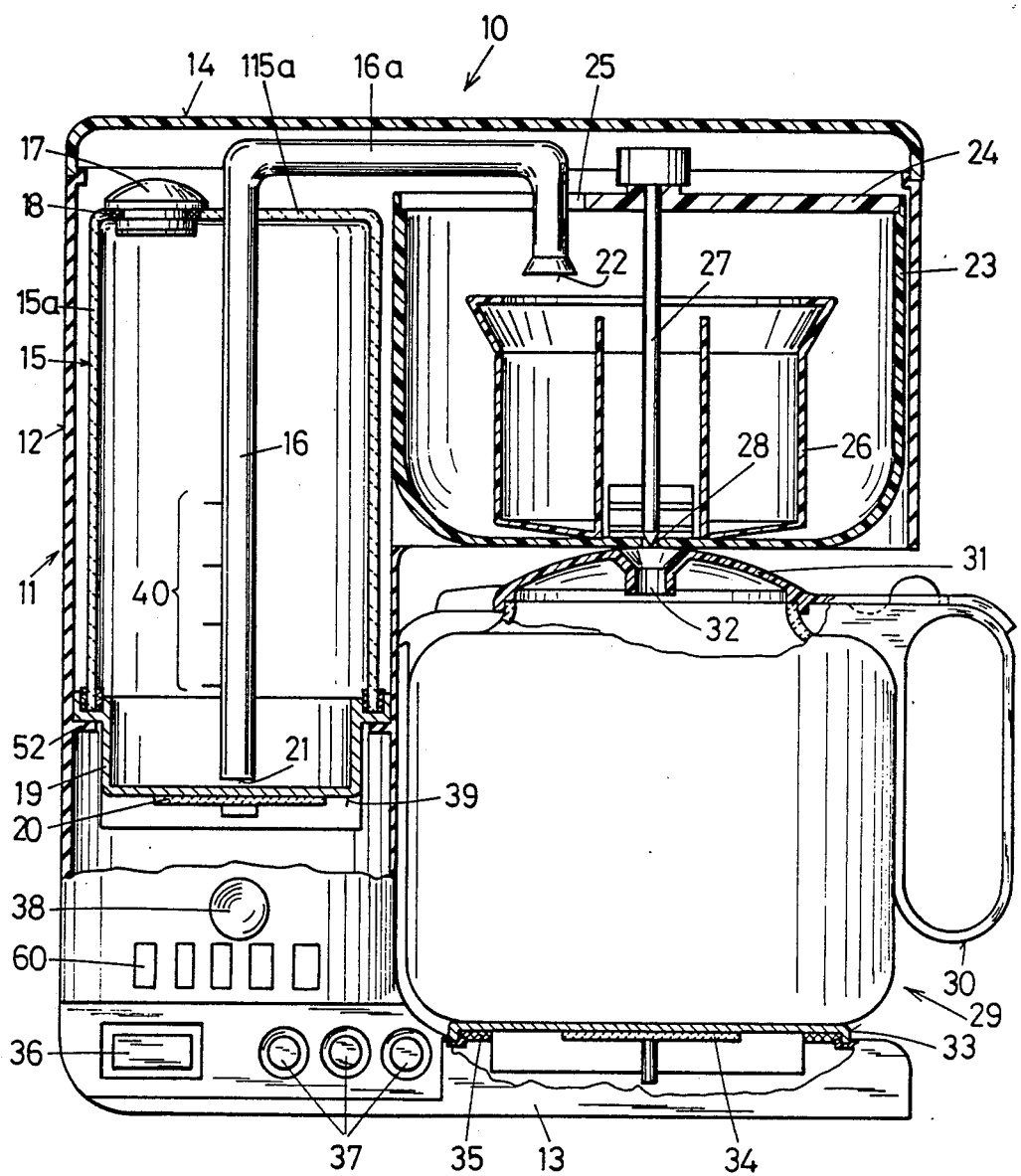
FIG. 1 is a partly elevational and partly vertical sectional view of a machine which embodies one form of the invention.

The drawing merely shows those components of the improved machine which are necessary for full understanding of the invention. For example, the drawing does not show a cable which is connectable to a wall outlet or to any other suitable source of electrical energy. Moreover, the drawing does not show all parts of the controls of the machine and/or all electrical conductors between the cable and the parts of the controls and/or between the individual parts of the controls. Any components and/or parts which are not shown in the drawing but are necessary or might be of advantage for proper or optimum operation of the machine can be identical with those of presently known tea making or other beverage making machines, for example, Coffee/Tea Maker No. 150, Coffee/Tea Maker No. 158, Coffee/Tea Maker No. 170, Dual System Coffee/Tea Maker No. 264 or Dual System Coffee/Tea Maker No. 269. All such makers are manufactured and distributed by the assignee of the present application. The non-illustrated components and/or parts can be installed in and-/or on the housing of the improved machine.

FIG. 1 shows an electric appliance 10 which is designed to constitute a tea making machine and comprises a housing 11 of an insulating plastic material. The housing 11 includes a hollow upright portion or section 12 and a hollow horizontal portion or section 13 which constitutes a leg and whose underside can be placed directly onto a table, onto a counter or onto any other suitable supporting structure for the machine 10. The underside of the housing portion 13 can be provided with friction pads, short feet or other suitable parts which come in direct contact with a supporting structure in a kitchen, in an office, in a recreation room, in a diner or restaurant, or elsewhere.

The housing portion 12 carries an upright container 15 for a supply of liquid (normally water) to be heated preparatory to coming in contact with a supply of tea leaves or another flavoring agent. The illustrated container 15 includes a lower portion 19 which can be made of aluminum or another suitable metallic material. The upper part of the lower portion 19 of the container 15 has a circumferentially extending external flange defining a groove for the lower end of the upper portion 15a of the container 15. A suitable seal, e.g., a silicon seal, is received in the groove of the flange at the upper end of the lower portion 19 so as to ensure that the interior of the container 15 is fluidtightly sealed from the atmosphere and that the assembled container can withstand internal pressures which develop when the supply of liquid in the container is heated to the boiling point. The connection between the portions 15a and 19 of the container 15 may but need not be a permanent or substantially permanent connection.

The upper portion 15a of the container 15 preferably consists, at least in part, of a light-transmitting (particularly transparent) material and carries a scale 40 with graduations denoting the quantity of liquid in the container. The graduations can denote different numbers of cups of tea which are obtained in response to heating a supply of liquid extending to the respective graduation.

The top wall 115a of the upper portion 15a of the container 15 has an opening which is normally closed by a bung or plug 17 with the interposition of a suitable seal 18. In order to ensure that the pressure in the container 15 cannot exceed a preselected maximum value, the plug 17 can be provided with one or more passages for the escape of steam. For example, the passages can constitute small-diameter bores or holes (not shown in FIG. 1). The plug 17 is detached from the top wall 115a of the upper portion 15a of the housing 15 when the person in charge wishes to replenish the supply of liquid or to evacuate the remnants of liquid from the interior of the container.

The plug 17 is accessible to the person in charge upon removal of a separable cover or lid 14 which constitutes a portion of or the entire top wall of the housing 11.

The machine 10 further comprises a conduit which serves to convey hot water and vapors from the interior of the container 15 into a steeping receptacle 23 which is preferably separably (removably) installed in the housing 11 adjacent the upper portion 15a of the container 15. The conduit includes a straight vertical or nearly vertical riser 16 and a horizontal pipe 16a which is connected to the upper end portion of the riser and has an outlet 22 for admission of heated liquid into the receptacle 23. The latter has a top wall 24 with an aperture 25 for the outlet 22. The conduit including the riser 16 and the pipe 16a can be made of aluminum or another metallic material. The pipe 16a is or can but need not be parallel or nearly parallel to the lid 14 of the housing 11. The major part of the riser 16 extends into the container 15, and this riser has an open lower end or inlet 21 for admission of heated liquid. Such inlet can but need not be immediately adjacent the bottom wall 39 of the lower portion 19 of the container 15. This will be explained with reference to FIGS. 5 and 6. In the machine 10 of FIG. 1, the riser 16 is or can be fixedly secured to the top wall 115a or is secured to the top wall 115a for angular movement about its vertical axis so that, in the absence of the receptacle 23, the outlet 24 can be swung along an arcuate path to an angular position in which it can discharge hot water into a cup, a bowl or another vessel for the purpose of making soup, instant coffee or another hot beverage. As shown in FIG. 1, the inlet 21 is sufficiently close to the bottom wall 39 to ensure that all or practically all heated liquid can ascend in the riser 16 to be admitted into the steeping receptacle 23.

Figure 2:
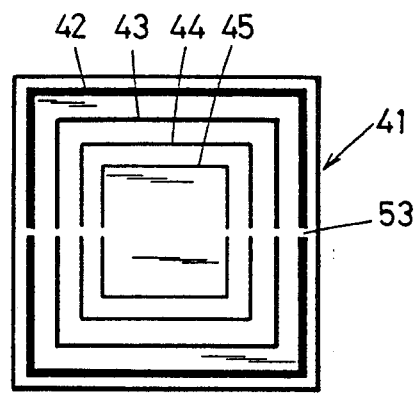
FIG. 2 is a bottom plan view of the carrier for thick film conductors in the electric heater of the machine of FIG. 1.

In order to permit rapid and economical heating of the supply of liquid in the container 15, the machine 10 comprises a novel and improved electric heater 20 which can be constructed in a manner as shown in FIG. 2. The heater 20 is disposed at and its plate-like insulating carrier 41 can be bonded to the underside of the bottom wall 39 of the lower portion 19 of the container 15. The exact nature of the adhesive which will be used to bond the carrier 41 to the underside of the bottom wall 39 depends upon the material of the carrier, upon the material of the bottom wall 39, on the desired force with which the carrier 41 is to adhere to the container 15 and/or on certain other parameters. Mechanical connections can be used in addition to or even in lieu of an adhesive.

FIG. 2 shows that the carrier 41 is a square or rectangular (i.e., polygonal) plate-like member which can be made of a ceramic, plastic or other suitable insulating material and one side of which carries an array of eight thick film conductors including two mirror symmetrical outermost conductors 42 of maximum width, two somewhat shorter neighboring conductors 43 of lesser width, two somewhat shorter conductors 44 of still lesser width, and two innermost conductors of minimum length and minimum width. The conductors of each pair are separated from each other by narrow gaps 53. The illustrated substantially U-shaped thick film conductors 42-45 can be replaced with otherwise configurated (e.g., semicircular or semielliptical) thick film conductors, and the conductors need not be disposed in pairs whose conductors are mirror symmetrical to each other with reference to a plane extending through the gap 53 and at right angles to the plane of FIG. 3. The number of thick film conductors can be reduced to one or increased to nine or more without departing from the spirit of the invention. It is also possible to dispose wider thick film conductors within narrower conductors or to select any other suitable combinations which can be properly applied to one side of the carrier 41 and can be used, either singly or in proper combinations with one another, to effect a predictable heating of selected quantities of liquid in the container 15.

The resistance of thick film conductors is inversely proportional to their width (it being assumed that the thickness of all conductors, as measured at right angles to the plane of FIG. 2 is the same). Thus, the conductors 42 offer the lowest and the conductors 45 offer maximum resistance to the flow of electric current. The exact manner in which the conductors 42-45 of the heater 20 of FIG. 2 can be connected with an energy source by depressing and/or merely touching the corresponding actuators 60 at the exterior of the housing 11 forms no part of the invention. For example, the number of actuators 60 can be selected with a view to ensure that the heater 20 can rapidly heat different quantities of liquid in the container 15, such as those required to make two, four, six, eight or ten cups of hot tea. The actuators 60 render it possible to save energy by putting to use only certain thick film conductors if all of the conductors need not contribute to the heating action because the container 15 is not completely filled with water.

The manner of making a paste which is to form one or more thick film conductors is well known in the art, the same as the methods of applying such paste to an insulating carrier. Reference may be had, for example, to published European patent application Ser. No. 0 158 779 which discloses many suitable materials for the making of paste as well as methods of applying paste to carriers of thick film conductors. The paste can contain a binder of glass or a suitable oxide, a pressure-resistant organic material, as well as a conducting material such as platinum, gold, bismuth, ruthenium or ruthenium oxide. It is presently preferred to employ thick film conductors which contain silver and palladium. The carrier 41 can be made of any one of a number of different insulating materials, such as glass, steatite, enamel-coated steel and ceramic substances. Highly satisfactory results were obtained with carriers of aluminum oxide.

Figure 3:
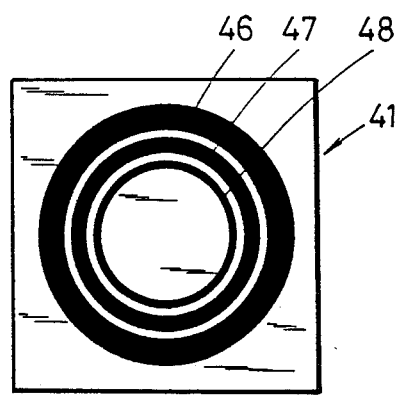
FIG. 3 is a bottom plan view of a carrier which is provided with a different array of thick film conductors.

FIG. 3 shows a portion of a modified heater wherein a polygonal plate-like carrier 41 of insulating material supports three circumferentially complete ring-shaped thick film conductors 46, 47 and 48. The width and the length of the median conductor 47 exceed those of the innermost conductor 48 but are less than those of the outer conductor 46. The common center of the conductors 46-48 preferably coincides with the center of the carrier 41.

Figure 4:
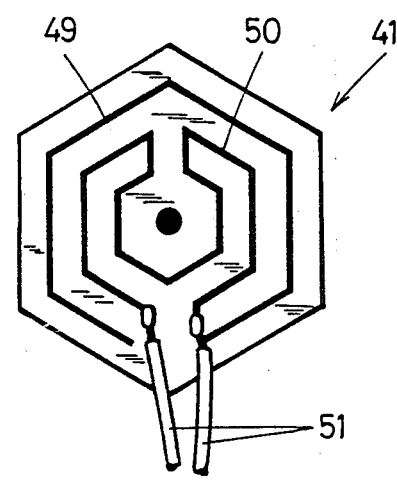
FIG. 4 is a bottom plan view of a hexagonal carrier which is provided with a further array of thick film conductors.

FIG. 4 illustrates a portion of a third heater wherein the plate-like carrier 41 resembles a regular hexagon and is made of a suitable insulating (e.g., ceramic) material. The carrier 41 supports two thick film conductors 49 and 50 whose ends are connected to the controls of the machine by wires 51. The manner in which the carrier 41 of FIG. 3 or 4 can be affixed to the bottom wall 39 of lower portion 19 of the container 15 is or can be the same as described in connection with FIGS. 1 and 2. A suitable bonding agent is preferred at this time.

Referring again to FIG. 1, the steeping receptacle 23 can be placed into immediate or close proximity to the upper portion 15a of the container 15, and the lid 14 can be designed to overlap the container 15 as well as the receptacle 23 and the pipe 16a. The receptacle 23 contains a removable or permanently installed insert or holder 26 for a supply of tea leaves, one or more tea bags or the like. The insert 26 is disposed centrally of the receptacle 23 and is provided with openings and/or slots for the flow of hot water toward a sealable outlet 28 in the bottom wall of the receptacle 23. The primary purpose of the insert 26 is to prevent tea leaves and/or tea bags from lying flat against the internal surface of the receptacle 23 so that such tea leaves and/or bags could not be adequately contacted by hot water. The entire insert 26 can be made of a single piece of suitable plastic material and rests on the bottom wall of the receptacle 23. The material of the insert 26 should be selected with a view to ensure that the insert will not adversely influence the aroma of the hot beverage. The internal and/or external surface of the insert 26 can be provided with ribs and/or otherwise configured projections which further reduce the likelihood of unsatisfactory contact between tea leaves and/or tea bags on the one hand and hot water on the other hand.

The outlet 28 in the bottom wall of the receptacle 23 is normally sealed by the shank of a valving element 27 whose head then rests on the central portion of the top wall 24 of the receptacle 23. The person in charge can gain access to the head of the valving element 27 upon lifting of the lid 14 so as to permit hot tea to flow from the interior of the receptacle 23 into a vessel 29 which is provided with a suitable handle 30 and has a detachable cover 31 with a centrally located opening 32 in register with the sealable outlet 28. The vessel 29 is or can be provided with a spout (not shown) for convenient pouring of hot tea into a cup of the like.

The illustrated rudimentary valving element 27 can be replaced with a more sophisticated device which controls the flow of hot tea from the steeping receptacle 23. For example, the outlet 28 can be normally sealed by a solenoid-operated valve which can be opened by a clock after elapse of a selected interval counting from the time of completion of the circuit of one or more thick film conductors forming part of the electric heater 20 beneath the bottom wall 39 of the container 15. The selected interval during which the outlet 28 remains sealed, while the receptacle 23 already contains hot water, will depend on the desired extent of steeping and on the desired quantity of hot tea which is to be transferred into the vessel 29. The latter can be made, at least in part, of a light-transmitting (e.g., transparent) material so that the person in charge can observe the quantity of hot tea therein.

The horizontal portion 13 of the housing 11 serves as a support for a warming plate 33 which constitutes a base or rest for the vessel 29. The warming plate 33 forms part of a heating device 34 which is installed in the housing portion 13 immediately beneath the warming plate and can include an insulating carrier and one or more thick film conductors similar to or identical with those shown in FIG. 2, 3 or 4. As a rule, the capacity of the heating device 34 will be a minute or small fraction of the capacity of the electric heater 20 because the device 34 is merely required to maintain the supply of hot beverage in the vessel 29 at or slightly above a minimum acceptable temperature. A washer-like insulator 35 (e.g., such insulator can be made of silicon) is interposed between the warming plate 33 and the support 13.

The housing 11 further supports the actuators 60 and all other necessary control elements. These can include one or more signal lamps 37 which indicate that thick film conductor or those thick film conductors of the heater 20 which are in actual use. One of the signal lamps 37 can light up when the heating device 34 for the warming plate 33 and the vessel 29 is on. An on-off electric switch 38 is installed in the housing above the signal lamps 37. The reference character 36 denotes in FIG. 1 a conventional adjustable clock which can turn off the heater 20 after a selected interval of use. Alternatively, or in addition to such function, the clock 36 can serve to determine the interval of time during which the device 34 heats the vessel 29 on the warming plate 33. The arrangement is preferably such that the device 34 can remain operative after the electric heater 20 has completed the heating of the supply of water in the container 15 so that the beverage in the vessel 29 can be maintained at a desired temperature for any selected interval of time.

Figure 5:
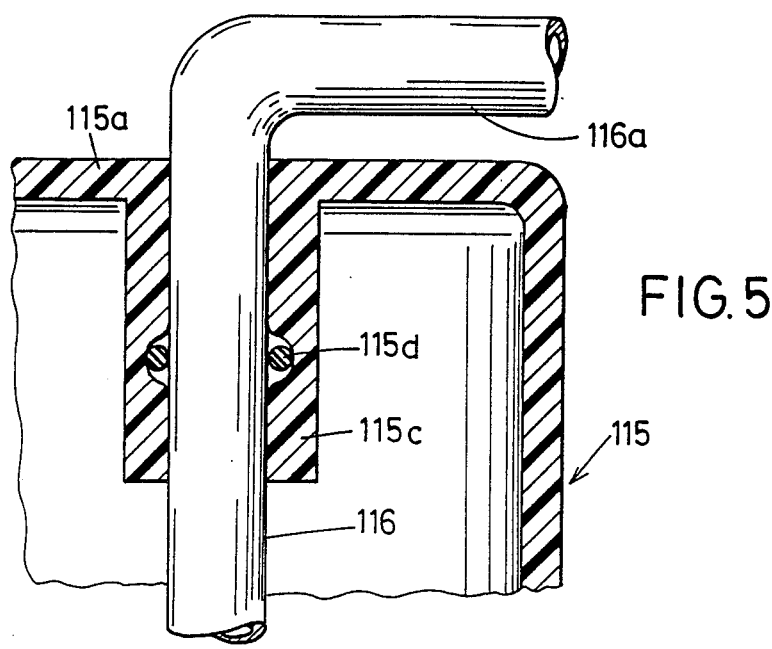
FIG. 5 is a sectional view of a portion of a modified machine wherein the riser is vertically movably installed in the top wall of the container for a supply of liquid.

FIG. 5 shows that the riser 116 can be vertically movably mounted in the top wall 115a of the container 115. The top wall 115a has a sleeve-like extension 115c which surrounds a portion of the riser 116. The internal surface of the extension 115c has at least one circumferentially complete groove for one or more ring-shaped sealing elements 115d of any suitable temperature-resistant elastomeric material which can frictionally engage and hold the riser 116 in a selected axial position. The directions in which the riser 116 is movable up and down (together with the pipe 116a) are indicated by a double-headed arrow 116a. This enables the riser 116 to move its inlet (not shown in FIG. 5) to any one of a plurality of different levels at different distances from the bottom wall of the container 115 and from the heater 20 (not shown in FIG. 5). In other words, the person in charge can select the quantity of liquid which remains in the container 115 beneath the lower end of the riser 116. It goes without saying that the lid 14 is removed or lifted when the riser 116 is to be moved upwardly, or that the lid 14 is sufficiently remote from the pipe 116a to permit upward and downward movements of the riser 116 within a desired range.

The manner in which a riser can be mounted for movement up and down relative to a container for a supply of liquid to be heated in a tea making machine is disclosed in the commonly owned copending patent application Ser. No. 195,125, now U.S. Pat. No. 4,843,954 filed May 16, 1988 by Stefan Henn for "Tea making machine".

The structure which is shown in FIG. 5 can further comprise suitable means for releasably locking or clamping the riser 116 in a selected axial position. However, the provision of one or more sealing rings between the riser 116 and the sleeve-like extension 115c can suffice to ensure that the riser 116 will be reliably held in a selected axial position but is ready to assume a different axial position in response to the application of an adequate pushing or pulling force to the pipe 116a. The aforementioned locking means can comprise a screw which meshes with a tapped bore of the top wall 115a of the container 115 and whose tip can be caused to engage the riser 116 when the latter assumes a selected axial position.

Figure 6:
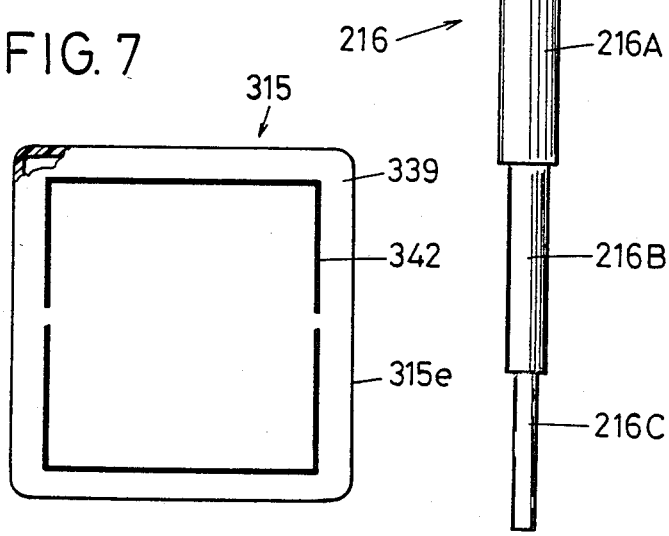
FIG. 6 is a schematic elevational view of a riser with tubular sections which are telescoped into each other.

The one-piece conduit 16, 16a of FIG. 1 or the one-piece conduit 116, 116a of FIG. 5 can be replaced with a composite conduit wherein at least the riser 216 (FIG. 6) includes a plurality of sections (216A, 216B, 216C) which are slidably telescoped into each other so that the effective length of the riser 216 can be changed while the pipe 216a remains at the same level. Thus, the distance between the outlet 222 and the bottom wall of the steeping receptacle (not shown in FIG. 6) can remain unchanged but the effective length of the riser 216 (and hence the distance of the inlet 221 from the bottom wall of the container for the riser 216) can be changed within a desired range. Once the length of the riser 216 is changed, the operator inserts the section 216A into the sleeve-like extension 115c of the top wall 115a shown in FIG. 5, and the machine embodying the conduit 216, 216a of FIG. 6 is ready for use with the inlet 221 located at a selected distance from the bottom wall of the container 115.

It will be appreciated that the riser 16, 116 or 216 need not be exactly vertical and that the conduit for conveying hot water from the container to the steeping receptacle can employ an arcuate and/or other wise configured riser which is not a straight pipe or does not comprise a set of two or three straight pipe sections.

If the riser 116 or 216 is to be moved axially between two positions which are sufficiently spaced apart to necessitate complete removal of the lid 14 when the riser assumes its uppermost position or one of its uppermost positions, the lid 14 can be pivotally mounted on the adjacent portion of the housing 11 or the lid can be provided with a hole for the upper portion of the riser 116 or 116 and for the pipe 116a or 216a.

Figure 7:
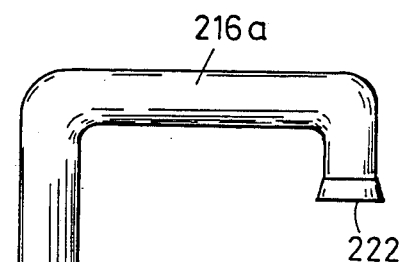
FIG. 7 is a bottom plan view of a modified container whose bottom wall constitutes an insulating carrier for thick film conductors.

FIG. 7 shows a modified container 315 which can be made of a single piece of suitable insulating material save for an opening which can receive the plug (not shown in FIG. 7). The bottom wall 339 of the container 315 constitutes an insulating carrier for one or more thick film conductors 342. FIG. 7 shows two mirror symmetrical U-shaped thick film conductors 342; however, the bottom wall 339 can serve as a carrier for three or more thick film conductors or for a single thick film conductor. Moreover, the illustrated U-shaped conductors 342 can be replaced with one or more conductors of the type shown in FIGS. 3 and 4 without departing from the spirit of the invention. An advantage of the container 315 is that it is simpler and less expensive than the composite container 15 of FIG. 1. Moreover, the heater including the bottom wall 339 and the thick film conductors 342 thereon is less expensive than the heater 20 of FIG. 1 because the heater of FIG. 7 need not employ a separately produced carrier which must be bonded or otherwise properly affixed to the container.

The container 315 can carry two or more sets of thick film conductors. For example, at least one of the sidewalls 315e can carry one or more thick film conductors in addition to or in lieu of the thick film conductors on the bottom wall 339. The thick film conductors can be imprinted directly onto one or more walls of the container 315 and/or onto the carrier 41 and/or onto the carrier of the heating device 34. The material of the container 315 can be any one of a number of different materials which are satisfactory electrical insulators, which can accept and retain thick film conductors, and which can stand the pressures and temperatures developing when a supply of water is heated in the container.

The improved machine is susceptible of many additional modifications. For example, the heater for the supply of liquid in the container can employ a circular, oval or otherwise shaped carrier for one or more thick film conductors. Furthermore, the shape, number, length and/or distribution of the thick film conductor or conductors in the heater for the supply of liquid in the container and/or for the warming plate 33 can be changed in a number of additional ways. Still further, the steeping receptacle 23 and its insert 26 can be altered as desired (e.g., to assume shapes known from conventional tea making machines), as long as the heater for the supply of liquid in the container (and preferably also the device for heating the warming plate 33) comprises at least one insulating carrier and one or more thick film conductors on each carrier.

An important advantage of the improved machine is that the electric heater for the supply of liquid in the container is simpler, more versatile and more compact than heretofore used electric resistance heaters. The efficiency of the improved heating device is greatly superior to that of electric resistance heaters. This also holds true for the heating device 34 which is provided beneath the warming plate 33. The improved heater and heating device can conform their energy requirements to the quantities of liquid to be heated or to be maintained at a desired temperature. The heater 20 and the heating device 34 preferably constitute self-regulating PCT (positive temperature coefficient) heating units.

Another important advantage of the improved machine is that the heater 20 need not be installed in the interior of the container. This is in contrast to certain heretofore known proposals in connection with the mounting of electric resistance heaters. Thus, the likelihood that the carrier of the heater 20 would come in contact with the liquid to be heated is practically nil so that adequate insulation of the heater presents no problems. The space requirements of the heater 20 are minimal, especially if the bottom wall and/or another wall of the container constitutes a carrier of one or more thick film conductors. The structure which is shown in FIG. 1 (wherein the lower portion 19 of the container 15 consists of a metallic material) exhibits the advantage that the transfer of heat between the container and the supply of liquid therein is very satisfactory. On the other hand, the structure of FIG. 7 exhibits the advantage that the heater including the thick film conductors 342 (and or any additional or other thick film conductors) is integrated into the container 315.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspect of my contribution to the art and, therefore, such adaptations should and are intended to be comprehended within the meaning and range of equivalence of the appended claims.

I claim:

1. Machine for making a hot beverage, particularly tea, by contacting a heated liquid with a flavoring agent, comprising a housing having a pressure-resistant container for a supply of liquid, said container having an upper portion and a lower portion; a steeping receptacle for a supply of flavoring agent and hot beverage in said housing, said receptacle having a sealable outlet for hot beverage; an electric heater for the supply of liquid in said container, including at least one insulating carrier in the region of the lower portion of said container and at least one thick film conductor on said carrier; and conduit means for conveying heated liquid from said container into said receptacle.

2. The machine of claim 1, wherein the lower portion of said container includes a bottom wall and said conduit means comprises a riser extending into said container and having an open lower end adjacent said bottom wall.

3. The machine of claim 1, wherein said carrier includes a plate-like member beneath said bottom wall, said member having an upper side adjacent said bottom wall and an underside, said at least one thick film conductor being provided at the underside of said member.

4. The machine of claim 2, wherein said carrier contains a ceramic material.

5. The machine of claim 2, wherein said carrier contains a plastic material.

6. The machine of claim 1, wherein said lower portion consists of a metallic material and includes a bottom wall, a portion at least of said upper portion consisting of a light-transmitting material, said carrier being provided beneath and being adjacent said bottom wall.

7. The machine of claim 1, wherein at least a portion of said upper portion transmits light and said upper portion is provided with graduations denoting different quantities of liquid in said container.

8. The machine of claim 1, wherein said portions of said container are separable from each other and further comprising a sealing element interposed between said portions.

9. The machine of claim 8, wherein said housing is hollow and includes an internal support for said container.

10. The machine of claim 1, wherein said lower portion includes a plurality of walls including at least one wall of insulating material, said at least one wall constituting said carrier.

11. The machine of claim 10, wherein said at least one wall has an inner side and an outer side and said at least one thick film conductor is applied directly to the outer side of said at least one wall.

12. The machine of claim 1, wherein said heater comprises a plurality of thick film conductors, and further comprising means for selectively connecting said conductors with an energy source.

13. The machine of claim 12, wherein said conductors include at least one first conductor having a first resistance and at least one second conductor having a different second resistance to the flow of electric current.

14. The machine of claim 12, wherein said conductors include at least one first conductor having a first width and at least one second conductor having a different second width.

15. The machine of claim 12, wherein said conductors include at least one first conductor having a first length and at least one second conductor having a different second length.

16. The machine of claim 1, wherein the lower portion of said container includes a bottom wall and said conduit means includes a riser extending into said container and having a liquid-admitting opening in said container, at least a portion of said riser being movable relative to said container so as to place said opening at a selected one of a plurality of different distances from said bottom wall.

17. The machine of claim 16, wherein said riser has a lower end and said opening is provided in said lower end.

18. The machine of claim 16, wherein said riser includes a plurality of tubular sections which are telescoped into each other.

19. The machine of claim 16, wherein said upper portion has a top wall and said riser is substantially vertically movably mounted in said top wall.

20. The machine of claim 1, wherein said housing includes a support for a vessel which is arranged to receive from the receptacle hot beverage by way of said outlet means, and further comprising means for heating the vessel on said support including a second insulating carrier in or on said support and at least one additional thick film conductor on said second carrier.

* * * * *